United States Patent Office 3,497,674
Patented Feb. 24, 1970

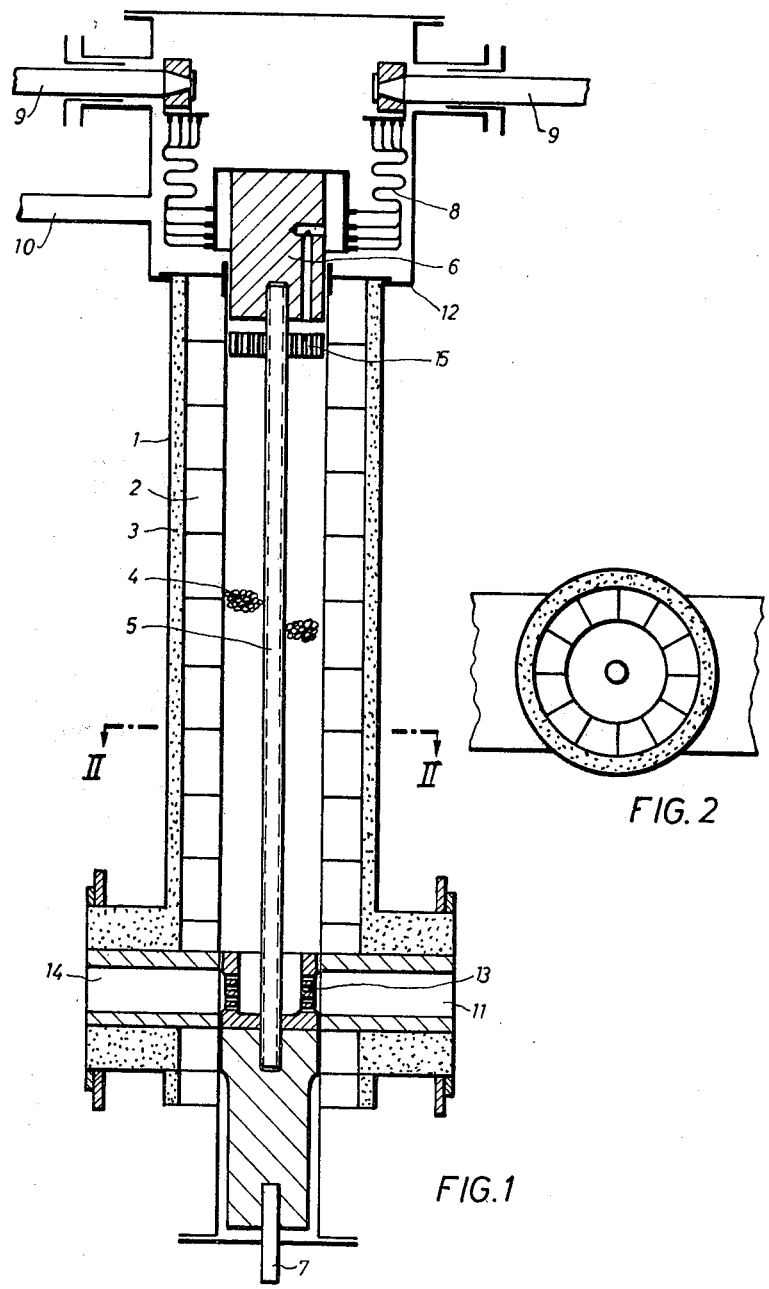

3,497,674
PROCESS AND APPARATUS FOR DIRECT ELECTRICAL HEATING OF GASEOUS SUBSTANCES
Hans Zirngibl, Duisburg, Karl Brändle, Krefeld, Karl Engel, Krefeld-Verberg, Walter Weidmann, Duisburg-Mundelheim, and Peter Beumer, Krefeld, Germany, assignors to Farbenfabriken Bayer Aktiengesellschaft, Leverkusen, Germany, a corporation of Germany
Filed Dec. 26, 1967, Ser. No. 693,478
Claims priority, application Germany, Jan. 2, 1967, F 51,151
Int. Cl. F24h 3/00
U.S. Cl. 219—381                                10 Claims

ABSTRACT OF THE DISCLOSURE

Process for the direct electrical heating of gaseous substances to elevated temperatures (e.g. 250–800° C.), by passing a gaseous substance, such as nitrogen, chlorine, hydrogen, metal halide or semi-metal halide, along a flow path through a packed bed through which an electrically energized heating element extends, with heating of the bed by passage of electric current therethrough and by thermal conduction and radiation from the resistance heating element, such that transfer of heat to the gaseous substance takes place substantially through the packed bed; and apparatus for carrying out such heating including reactor flow path means, e.g. lined with insulating refractory material, a packed bed of particles disposed in the flow path means, e.g. electrically and thermally conductive particles inert to the gaseous substance such as carbon, graphite, coke, etc., and at least one electrically energizable resistance heating element disposed in the flow path means and extending through the bed and being surrounded thereby, e.g. a tube or rod composed of an electrically and thermally conductive material such as carbon, graphite, carbide, metal, and composite mixtures thereof.

---

This invention relates to a method of, and an apparatus for, the direct electrical heating of gases or gaseous substances, for example vapors, using a reactor lined with a refractory, insulating material. The direct electrical heating of gases and vapors is frequently carried out with the aid of rod-shaped or tubular resistance heating elements around which, or through which, the gas to be heated flows. Arrangements of this kind are attended by the disadvantage that the heat-exchange surfaces are always relatively small so that, in practice, the process can only be carried out with gases of the kind that absorb radiation heat. However, it is possible to obtain large heat-transfer surfaces by using electrically heated moving or fluidized beds consisting of carbon or graphite or mixtures thereof with inert particles as the bed material, or of carbon, coke, graphite and so on in bulk, which are placed between the electrodes in such a way that the gas has to ascend through the electrically heated bulk material.

Unfortunately, these last two processes are also attended by disadvantages. In an electrically heated fluidized bed, the material used to make up the bed undergoes extensive abrasion, whilst the heating system has to be followed by a heated gas-purifying unit. The losses through abrasion are high, particularly in cases where carbon is used in admixture with a much harder inert material. In addition to this, there are limits to the throughput volume of gas because a fluidized bed of given dimensions is not universally applicable. On the contrary, the bed has to be accurately adapted to the particular reaction conditions.

The bulk bed made up of carbon or graphite in the form of large lumps is preferably used for reactors of relatively large dimensions. With relatively small reactors, the particle size of the bulk material has to be reduced accordingly to provide a large heat-exchange area. The result of this, at least in cases where the gas flows upwards, is that the particles of the bulk material no longer lie firmly and immovably on top of one another, but loosen up and move relatively to one another, even at relatively low rates of gas flow. If graphite spheres 10 mm. in diameter and a gas temperature of 700° C. are used, the "fluidizing rate" is 4.5 m./sec. in the case of nitrogen, 3.0 m./sec. in the case of chlorine and even less in the case of metal chloride vapors. The "fluidizing rate" is the rate of gas flow, calculated for the empty tube, at which the bulk material begins to loosen up and to move.

It is clear that the material begins to loosen at relatively low rates of gas flow. Once loosening begins, adequate contact is of course lost, resulting in arcs which can lead to serious disturbances. If the arcs occur near the wall, the wall material may begin to melt, leading to both encrustation of the bulk material and deterioration in current flow. Arc-induced overheating can also promote chemical reactions between the ceramic material of the lining and the carbon or graphite. If the material in question is one which contains silicon dioxide, reduction to SiO for example can take place, the SiO formed being disproportionated again at colder zones in the bed. As a result, a coating of $SiO_2$ is formed over the carbon and current flow becomes progressively worse, leading to a greater number of flash-overs. Finally, current flow is impeded altogether or, due to encrustation, the flow of gas is complicated to a considerable extent, both resulting in frequent stoppage of the reaction.

It has now been found in accordance with the present invention that gases or gaseous substances such as vapors, for example, can be directly electrically heated if the gases or gaseous substances are passed through a packed bed which is heated by the passage of an electric current through it and by the thermal conduction and radiation of a resistance heating element surrounded by the packed bed, so that the transfer of heat to the gas takes place largely through the packed bed. As a result, an uninterrupted transfer of heat is obtained in the packed bed despite the use of a bulk material in the form of small chips to obtain a large heat-exchange surface, even in cases where the gas flows in an upward direction. In addition, the invention obviates contact difficulties within the bed so that no arcing occurs, and overheated zones within the bed are also avoided. The process according to the invention is carried out with a reactor lined with an insulating, refractory material between whose gas-inlet and gas-outlet openings a packed bed of carbon, graphite or a similar conductive material is arranged, surrounding at least one electrical resistance heating element provided with current leads. The resistance heating element is with advantage held between two electrodes, at least one of which is movable, being provided with an elastic lead, i.e. to accommodate heat-induced expansion of the resistance heating element.

Since the flow of current is guaranteed by the incorporation of the resistance heating element, the packed bed may consist of particles of any size. They no longer have to lie on top of one another under their own weight to establish contact. On the contrary, the particles can be kept so small that the gas to be heated approaches the fluidizing rate. The fact that there are wide ranges possible as to the size of the particles has distinct advantages. Generally the particle size is limited on the lower side to avoid discharge of the particles, dust formation and a high resistance against the gas through-put or high pressure loss of the gases passing the bed. On the other hand the particle size should be not high enough to affect the optimum surface/volume ratio. Graphite particles usually are used with a diameter of between about 3 and 30 preferably of 5 and 15 mm. In cases where graphite or a similar material is used to make up the packed bed, the particles will dissipate a considerable amount of the heat liberated in the resistance heating element, apart from a small radiation component, into the bed by virtue of their high thermal conductivity, so that the heat can be given up to the gas in the bed due to the large heat-exchange area available there. By virtue of the freedom of choice in the size of the bed particles, it is also possible to vary the heat-exchange area within wide limits by varying the size of the particles in a reactor of constant dimensions (e.g. by decreasing uniformly the particle size along the flow path of the bed to increase the intensity of the effect prior to the gas outlet). This factor is of particular importance in the heating of gases which themselves do not absorb any radiation heat because, in this case, the heat transfer area is of decisive importance so far as adequate heat transfer is concerned. However, the heat is not generated solely in the resistance heating element. The bed also has a current flowing through it by virtue of its electrically conductive contact with the heating element, so that it also heats itself. The portion of current flowing through the bed can amount to one-third for example. To compensate for any thermal expansion affecting the resistance heating element held between the electrodes, steps should be taken to ensure that the resistance heating element can be displaced relatively to the packed bed and hence relatively to the reactor, e.g. by movably mounting at least one of the electrodes and providing it with an elastic lead. The invention provides another advantage. Since the uniform flow of current is guaranteed by the resistance heating element and since the bed particles do not have to be tightly packed, the apparatus described may be mounted in any spatial position. It may be operated downwards, upwards or even horizontally.

The specific opearting conditions such as gas flow through the reactor, particle size and composition of the bed material, electrical energy supply to the system etc. depend on the gas or vapor to be heated and the desired temperature thereof, the apparatus dimensions and the like. The necessary phsyical and caloric data to calculate the exact conditions can be taken from physico-chemical handbooks such as Landolt Börnstein, D'Ans-Lax and the like. To prevent the formation of arcs in the bed a voltage of more than 50 volts is to be avoided. With the use of graphite electrodes the cross section charge thereof should be in the range of about 1–4 amps./mm.² With downwardly operating apparatus the gas flow is mainly limited by the heat transfer in order to obtain the desired gas temperature, whereas with upwardly or horizontally apparatus the gas flow should not be high enough to effect fluidization of the bed particles i.e. the velocity of the gases should not be substantially higher than the fluidization point of the system.

The process according to the invention is suitable for heating a variety of gases such as nitrogen, chlorine, hydrogen or metal and semi-metal halides, e.g. in vapor form, such as, for example, silicon tetrachloride, titanium tetrachloride, aluminum chloride, boron chloride, germanium chloride, iron chloride, tin chloride, zinc chloride and the like. The term "semi-metal halide" as used in the present invention comprises the halides of the IV$a$, V$b$ and VI$b$ elements of the Periodic System (Chemiker Kalender, Springer-Verlag 1956, page 2). The preheated gases at temperatures of up to 1200° C., preferably at 250–800° C., may be used for instance in vapor phase oxidation processes such as those disclosed and claimed in copending U.S. applications: Ser. No. 361,357, filed Apr. 21, 1964—now abandoned in favor of Ser. No. 682,720, filed Oct. 31, 1967; Ser. No. 540,633, filed Apr. 6, 1966; and Ser. No. 686,247, filed Nov. 28, 1967 (corresponding to German application F 50,816, filed Dec. 1, 1966). The process is particularly suitable for gases which themselves do not absorb radiation heat, although the invention is not limited in its application to gases of this kind. The resistance heating element may be composed of a variety of materials such as, for example, metals or composite materials containing metals, carbon, graphite, carbides and/or similar conductive materials. The bed materials selected should be suited to the gases to be heated and should be inert with respect to the tube or rod material at the temperatures prevailing, e.g. graphite, carbon, coke, etc. The lining of the reactor should also be chosen in such a way that the substances to be heated are inert thereto. Suitable lining materials include, for example, highly refractory oxidic or silicate materials, $SiO_2$, $Al_2O_3$, mullite, steatite or graphite. The process according to the invention and an embodiment of the apparatus in which it may be carried out are illustrated by way of example in the accompanying drawing in which FIG. 1 shows a longitudinal section of a reactor and FIG. 2 a transverse section taken along the line II—II of FIG. 1.

The heating zone consists of a cylindrical metal jacket 1 which is provided with a refractory, insulating lining 2, 3. A packed bed 4 (shown schematically) of graphite, carbon or the like, which surrounds a resistance heating element 5, fixedly connected at both ends with the electrodes 6 and 7, is arranged in the metal jacket. Whilst the electrode 7 is immobile, the electrode 6 is displaceable to compensate for any thermal expansion which may occur in operation. Expansion is absorbed by an elastic lead 8 which is fixedly connected with a double electrode 9 guided through the housing under insulation. The gas to be heated is supplied through a pipe 10. The hot gas emerges again at a point 11. The main part of the electrode 6, the elastic lead 8, the insulated electrode 9 and the gas supply pipe 10 are accommodated in the widened part 12 of the apparatus. This section remains relatively cold and may be composed of a metal which is resistant to the gases to be heated.

At the end of the heating zone, there is a perforated graphite ring 13 which retains the bulk material and through which the heated gas passes. Opposite the gas outlet 11 there is another pipe 14 through which another gas may be introduced if required. A perforated plate 15 holds the packed bed in position. It is provided internally with a bore hole through which the resistance rod or bar 5 extends. This plate enables the rod 5 and the electrode 6 to move without obstruction relatively to the bed 4.

The apparatus may be run on direct current or alternating current. In both cases, the housing may be earthed at one terminal. In cases where direct current is used, the electrodes 6 and 9 and the elastic lead 8, which is advantageously made of stranded wire or folded metal strips, will preferably be the voltage-carrying parts. In this case, the electrode 7 is conductively connected with the housing which in turn is earthed. If alternating current is used and if the housing is not intended to carry voltage, the electrode 7 will again be guided through the housing with insulation.

The bed 4 of packing material is only shown schematically although it will be realized that the annular interior between rod 5 and lining 3 is meant to be filled substantially completely by the bed particles, e.g. carbon, graphite, coke, etc., and that such bed either may be substantially moving or quiescent during gas flow therethrough. Naturally, the bed particles are formed of electrically and thermally conductive particles which are substantially inert to the heated gas yet which permit thermal conduction and radiation heat given off by the rod 5 to pass therethrough to heat uniformly the gas in addition to the heat given off to the gas by the electrical resistance heating of the bed particles themselves due to their random electrically conductive contact with said heating rod 5.

The invention is further illustrated by the following examples without being restricted thereto:

EXAMPLE 1

630 litres=1086 kg. of titanium tetrachloride vapor are heated from 240 to 500° C. in an apparatus as shown in FIG. 1. The TiCl$_4$ vapor is introduced through the pipe 10; the hot gas is removed via pipe 11. The resistance heating element 5 consists of a graphite tube having an outside diameter of 40 mm. and an inside diameter of 30 mm. Thus, the cross section F is 550 mm.$^2$. The graphite tube 5 is surrounded by a packed bed of graphite particles having an average particle size of 8 mm. The length $l$ of the bed is 1500 mm., the diameter 200 mm., so that the packed bed has a volume of about 47 litres. The reactor is lined with steatite. In cases where direct current is used, the apparatus is operated with a voltage U of 40.1 volts at a current intensity J of 1380 amperes, i.e. at an electrical power of N=55.5 kilowatt. The radiation losses of the reactor amount the 11.1 kilowatt which corresponds to 20%, while the remaining 44.4 kilowatt≙38,100 kcal./h. are used for heating up the TiCl$_4$ vapor. The average gas velocity, referred to the empty tube, is 2.63 m./s., the average residence time in the packed bed is 0.57 sec.

According to the above data the following values can be calculated:

Electrical resistance of the reactor:

$$R \left( = \frac{U}{J} = \frac{40.1 \text{ v.}}{1380 \text{ a.}} = \right) 0.029 \Omega$$

Specific electrical resistance referred to the graphite tube:

$$\left( = \frac{R.F}{l} = \frac{0.029 \Omega .55 \text{ mm.}^2}{1.5 \text{ m.}} = \right) 10.6 \frac{\Omega \text{mm.}^2}{\text{m.}}$$

The specific resistance of the graphite material for the resistance heating tube is about $$15 \frac{\Omega \text{ mm.}^2}{\text{m.}}$$

From a comparison with the value of 10.6 there follows that the bed absorbs about ⅓ of the current passage.

EXAMPLE 2

29 standard cubic meters of nitrogen are heated per hour from 10 to 800° C. The gas is introduced through the pipe 10, the hot gas is removed via pipe 11. The resistance heating rod 5 of graphite having a diameter of 10 mm. is surrounded by a packed bed 4 of graphite particles having an average particle size of 8 mm. The length 1 of the bed is 1200 mm., the diameter 70 mm. The apparatus is run on direct current at a voltage U of 47.9 volts, a current intensity J of 287 amperes, i.e. at a power N of 13.8 kilowatt. The radiation losses amount to 3.63 kilowatt corresponding to 26.3%. The remaining 10.2 kilowatt ≙ 8760 kcal./h. are used for heating up the nitrogen. The average gas velocity is 5.3 m./s., the average residence time in the packed bed is 0.23 second.

The following values result:

Electrical resistance of the reactor:

$$R \left( = \frac{U}{J} = \frac{47.9}{287} = \right) 0.167 \Omega$$

Specific electrical resistance referred to the graphite tube:

$$s \left( = \frac{R.F}{l} = \frac{0.167 \Omega .78.5}{1.2} = \right) 11 \frac{\Omega \text{mm.}^2}{\text{m.}}$$

Cross sectional charge referred to the graphite tube:

$$\eta \left( = \frac{J}{F} = \frac{287}{78.5} = \right) 3.66 \text{ a./mm.}^2$$

Surface charge referred to the graphite tube:

$$\nu \left( = \frac{N}{O} = \frac{N}{\pi .d.l} = \frac{13,800}{37,700} = \right) 0.366 \text{ w./mm.}^2$$

Cross sectional charge referred to the graphite tube:

$$\eta \left( = \frac{J}{F} = \frac{1380 \text{ a.}}{550 \text{ mm.}} = \right) 2.51 \text{ a./mm.}^2$$

Surface density charge referred to the graphite tube:

$$\nu \left( = \frac{N}{O} = \frac{N}{\pi .d_a.e} = \frac{55,500 \text{ mm.}^2}{188,000 \text{ mm.}^2} = \right) 0.295 \text{ w./mm.}^2$$

What is claimed is:

1. Process for the direct electrical heating of gaseous substances to temperatures of between about 250 and 1200° C. which comprises passing such gaseous substance along a flow path through a packed bed, porous to the flow of gas and composed of electrically and thermally conductive particles, having an electrically energized resistance heating element extending therethrough and maintained at least in part in electrically conductive contact with such bed particles, while heating the bed by passage of electric current therethrough and by thermal conduction and radiation from the resistance heating element, such that transfer of heat to such gaseous substance takes place substantially solely through the particles of said packed bed.

2. Process according to claim 1 wherein the bed is composed of electrically and thermally conductive particles inert to the gaseous substance, and the resistance heating element is composed of an electrically and thermally conductive material.

3. Process according to claim 1 wherein said particles are composed of a material selected from the group consisting of carbon, graphite, coke and mixtures thereof, and said resistance heating element is composed of a material selected from the group consisting of carbon, graphite, carbide, metal, and composite mixtures thereof.

4. Process according to claim 1 wherein said gaseous substance is selected from the group consisting of nitrogen, chlorine, hydrogen, metal halide, and semi-metal halide.

5. Process according to claim 4 wherein said gaseous substance is heated to a temperature substantially between about 250–800° C.

6. Process for the direct electrical heating of gaseous substances to elevated temperatures which consists essentially of passing such gaseous substance along a flow path through a packed longitudinal bed composed of particles of electrically and thermally conductive material inert to such gaseous substance having an electrically energized resistance heating element composed of electrically and thermally conductive material inert to such gaseous substance extending longitudinally therethrough and maintained at least in part in electrically conductive contact therewith, while heating the bed by passage of electric current directly from the resistance heating element therethrough and by the vicinal thermal conduction and radiation substantially uniformly emanating along said path from the resistance heating element, such that transfer of heat to such gaseous substance from the electrically energized resistance heating element takes place substantially and primarily through the packed bed and in a substantially uniform manner.

7. Apparatus for carrying out the direct electrical heating of gaseous substances to elevated temperatures which comprises means defining a reactor longitudinal flow path for heating gaseous substances, a packed longitudinal bed porous to the flow of gas and composed of electrically and thermally conductive particles disposed in such longitudinal flow path means, and at least one electrically energizable resistance heating element disposed correspondingly longitudinally in such flow path means and extending longitudinally through the bed and being surrounded thereby and maintained at least in part in electrically conductive contact with such bed particles, such that transfer of heat to such gaseous substance takes place substantially solely through the particles of said packed bed.

8. Apparatus according to claim 7 wherein the bed is composed of electrically and thermally conductive particles inert to the gaseous substance, and the resistance heating element is composed of an electrically and thermally conductive material.

9. Apparatus according to claim 7 wherein said particles are composed of a material selected from the group consisting of carbon, graphite, coke and mixtures thereof, and said resistance heating element is composed of a material selected from the group consisting of carbon, graphite, carbide, metal, and composite mixtures thereof.

10. Apparatus for carrying out the direct electrical heating of gaseous substances to elevated temperatures which comprises means defining a reactor longitudinal flow path for heating gaseous substances lined with insulating refractory material, a packed longitudinal bed porous to the flow of gas and composed of electrically and thermally conductive particle material inert to such gaseous substance confinedly disposed in such flow path means and occupying substantially completely the flow cross section thereof, and at least one electrically energizable resistance heating element composed of electrically and thermally conductive material inert to such gaseous substance, longitudinally adjustably disposed in such flow path means to compensate for expansion and contraction with changes in temperature, and extending longitudinally through the bed and being surrounded thereby and maintained at least in part in electrically conductive contact with such bed particle material, such that the bed is heated by passage of electric current directly from the resistance heating element therethrough and by the resultant vicinal thermal conduction and radiation substantially uniformly emanating along said path from the resistance heating element, and such that transfer of heat to such gaseous substance from the electrically energizable resistance heating element takes place substantially and primarily through the particle material of said packed bed in a substantially uniform manner.

References Cited

UNITED STATES PATENTS

| | | | |
|---|---|---|---|
| 654,467 | 7/1900 | Mactear | 13—20 |
| 679,973 | 8/1901 | Lance et al. | 13—20 |
| 1,410,566 | 3/1922 | Hadaway | 13—20 |
| 2,235,401 | 3/1941 | Gier | 23—288 |
| 2,563,115 | 3/1949 | Legatski | 23—288 |
| 2,670,426 | 2/1954 | Stone | 13—20 X |
| 3,136,836 | 6/1964 | Tanaka | 219—50 X |

ANTHONY BARTIS, Primary Examiner

U.S. Cl. X.R.

13—20; 23—288; 219—307, 338, 374, 378

PO-1050
(5/69)

UNITED STATES PATENT OFFICE
CERTIFICATE OF CORRECTION

Patent No. 3,497,674      Dated February 24, 1970

Inventor(s) HANS ZIRNGIBL, KARL BRÄNDLE, KARL ENGEL, WALTER WEIDMANN, and PETER BEUMER It is certified that error appears in the above-identified patent and that said Letters Patent are hereby corrected as shown below:

Column 3, line 40, "opearting" should be --operating--; column 6, line 3, "1380 a." should be --1380 $A_2$--; column 6, line 6, "55,500 mm.$^2$" should be -- 55,500 $W_2$ -- ; column 8, line 18, "2,563,115" should be --2,463,115--

SIGNED AND
SEALED
JUL 14 1970

(SEAL)
Attest:

Edward M. Fletcher, Jr.
Attesting Officer

WILLIAM E. SCHUYLER, JR.
Commissioner of Patents